(12) United States Patent
Husain

(10) Patent No.: US 9,146,121 B2
(45) Date of Patent: Sep. 29, 2015

(54) NAVIGATION SYSTEM WITH OBSTACLE ACCOMMODATING EMERGENCY ROUTE PLANNING MECHANISM AND METHOD OF OPERATION THEREOF

(75) Inventor: Aliasgar Mumtaz Husain, Milpitas, CA (US)

(73) Assignee: TELENAV, INC., Sunnyvale, CA (US)

( * ) Notice: Subject to any disclaimer, the term of this patent is extended or adjusted under 35 U.S.C. 154(b) by 830 days.

(21) Appl. No.: 12/889,649

(22) Filed: Sep. 24, 2010

(65) Prior Publication Data

US 2012/0078506 A1   Mar. 29, 2012

(51) Int. Cl.
*G01C 21/00* (2006.01)
*G01C 21/34* (2006.01)
*G08G 1/0968* (2006.01)
*G08G 1/00* (2006.01)

(52) U.S. Cl.
CPC ...... *G01C 21/3492* (2013.01); *G08G 1/096811* (2013.01); *G08G 1/096844* (2013.01); *G08G 1/096861* (2013.01); *G08G 1/205* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,704,610 A * | 11/1987 | Smith et al. | | 340/906 |
| 4,775,865 A * | 10/1988 | Smith et al. | | 340/906 |
| 5,504,482 A * | 4/1996 | Schreder | | 340/995.13 |
| 5,801,646 A * | 9/1998 | Pena | | 340/902 |
| 5,955,968 A * | 9/1999 | Bentrott et al. | | 340/906 |
| 6,630,891 B1 * | 10/2003 | Dilling | | 340/902 |
| 6,700,504 B1 * | 3/2004 | Aslandogan et al. | | 340/901 |
| 6,754,580 B1 * | 6/2004 | Ask et al. | | 701/117 |
| 6,862,524 B1 * | 3/2005 | Nagda et al. | | 701/420 |
| 6,958,707 B1 * | 10/2005 | Siegel | | 340/902 |
| 7,395,151 B2 * | 7/2008 | O'Neill et al. | | 701/411 |
| 7,414,542 B2 * | 8/2008 | McMahon | | 340/907 |
| 7,426,437 B2 * | 9/2008 | Breed et al. | | 701/301 |
| 2003/0154017 A1 * | 8/2003 | Ellis | | 701/117 |
| 2005/0104745 A1 * | 5/2005 | Bachelder et al. | | 340/906 |
| 2006/0125655 A1 * | 6/2006 | McMahon | | 340/907 |
| 2006/0184319 A1 * | 8/2006 | Seick et al. | | 701/209 |
| 2006/0247849 A1 * | 11/2006 | Mohsini et al. | | 701/206 |
| 2007/0138347 A1 * | 6/2007 | Ehlers | | 246/1 R |
| 2007/0159354 A1 * | 7/2007 | Rosenberg | | 340/902 |
| 2007/0174467 A1 * | 7/2007 | Ballou et al. | | 709/227 |
| 2007/0198168 A1 * | 8/2007 | Nathan et al. | | 701/117 |
| 2007/0282638 A1 * | 12/2007 | Surovy | | 705/4 |
| 2008/0040031 A1 * | 2/2008 | Tu | | 701/209 |
| 2008/0189034 A1 * | 8/2008 | Sugiura | | 701/209 |
| 2008/0281960 A1 * | 11/2008 | Schibler | | 709/224 |
| 2009/0030603 A1 * | 1/2009 | Madalin et al. | | 701/202 |
| 2009/0119014 A1 * | 5/2009 | Caplan | | 701/213 |
| 2009/0174572 A1 * | 7/2009 | Smith | | 340/902 |

(Continued)

OTHER PUBLICATIONS

International Search Report for PCT Application No. PCT/US2011/041702 dated Oct. 28, 2011.

*Primary Examiner* — Jonathan L Sample
(74) *Attorney, Agent, or Firm* — IP Investment Law Group

(57) ABSTRACT

A method of operation of a navigation system includes: receiving an entry for a destination where an emergency had occurred; detecting a current location for locating an emergency vehicle; receiving traffic information between the current location and the destination for identifying a traffic flow; extrapolating a vehicle location based on the traffic information for locating a non-emergency vehicle in the traffic flow; and generating an emergency route from the current location to the destination by accommodating the vehicle location for displaying on a device.

24 Claims, 7 Drawing Sheets

(56) References Cited

U.S. PATENT DOCUMENTS

| | | | |
|---|---|---|---|
| 2010/0098486 A1* | 4/2010 | Miracle | 404/6 |
| 2010/0106395 A1* | 4/2010 | Gadler | 701/117 |
| 2010/0141477 A1* | 6/2010 | Lim et al. | 340/906 |
| 2010/0153002 A1* | 6/2010 | Lee et al. | 701/201 |
| 2010/0228404 A1* | 9/2010 | Link, Ii et al. | 701/1 |
| 2010/0245581 A1* | 9/2010 | Koyama et al. | 348/149 |
| 2010/0292914 A1* | 11/2010 | Vepsalainen | 701/200 |
| 2011/0018736 A1* | 1/2011 | Carr | 340/902 |
| 2011/0040621 A1* | 2/2011 | Ginsberg et al. | 705/14.49 |
| 2011/0102202 A1* | 5/2011 | Lin | 340/988 |
| 2011/0109480 A1* | 5/2011 | Huijnen et al. | 340/932.2 |
| 2011/0264360 A1* | 10/2011 | Boss et al. | 701/117 |
| 2012/0072051 A1* | 3/2012 | Koon et al. | 701/2 |
| 2012/0078506 A1* | 3/2012 | Husain | 701/414 |

\* cited by examiner

NAVIGATION SYSTEM WITH OBSTACLE ACCOMMODATING EMERGENCY ROUTE PLANNING MECHANISM AND METHOD OF OPERATION THEREOF

TECHNICAL FIELD

The present invention relates generally to a navigation system, and more particularly to a system for obstacle accommodating emergency route planning mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a route planning continues to be a paramount concern for the consumer. Inadequate planning of the route by the navigation system decreases the benefit of using the navigation tool.

Thus, a need still remains for a navigation system with obstacle accommodating emergency route planning mechanism to generate a route that can accommodate for the obstacles that can exist along the path to the emergency sites. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving an entry for a destination where an emergency had occurred; detecting a current location for locating an emergency vehicle; receiving traffic information between the current location and the destination for identifying a traffic flow; extrapolating a vehicle location based on the traffic information for locating a non-emergency vehicle in the traffic flow; and generating an emergency route from the current location to the destination by accommodating the vehicle location for displaying on a device.

The present invention provides a navigation system, including: an input module for receiving an entry for a destination where an emergency had occurred; a current detector module, coupled to the input module, for detecting a current location for locating an emergency vehicle; a traffic recognizer module, coupled to the current detector module, for receiving traffic information between the current location and the destination for identifying a traffic flow; a traffic extrapolator module, coupled to the traffic recognizer module, for extrapolating a vehicle location based on the traffic information for locating a non-emergency vehicle in the traffic flow; and a route generator module, coupled to the traffic extrapolator module, for generating an emergency route from the current location to the destination by accommodating the vehicle location for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
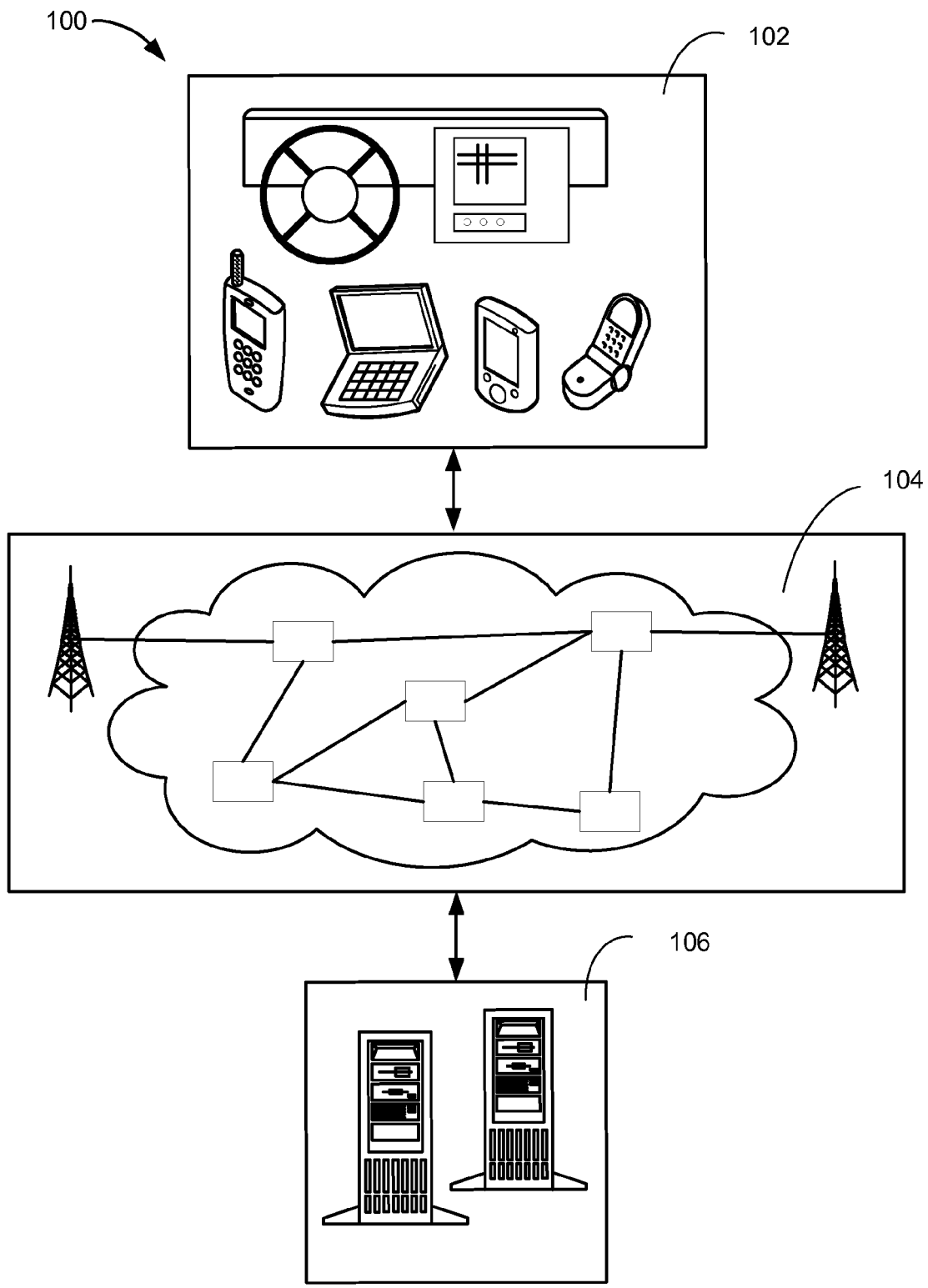
FIG. 1 is a navigation system with obstacle accommodating emergency route planning mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with obstacle accommodating emergency route planning mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 (™) Business Class mainframe or a HP ProLiant ML (™) server. Yet another example, the second device 106 can be a particularized machine, such as a portable computing device, a thin client, a notebook, a netbook, a smartphone, personal digital assistant, or a cellular phone, and as specific examples, an Apple iPhone (™), Palm Centro (™), or Moto Q Global (™).

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof Referring now to FIG. 2, therein is shown an example display of a display interface 202 of the first device 102. An emergency route 204 is defined as a path that an emergency vehicle 206 with the navigation system 100 can take to reach the target destination and the path includes routes not accessible to non-emergency vehicles. The emergency route 204 includes a current location 208, a destination 210, or a combination thereof.

The emergency vehicle 206 is defined as any vehicle that is designated and authorized to respond to an emergency 212. For example, the emergency vehicle 206 can include a police car, an ambulance, or a fire truck. The emergency 212 is defined as a situation that poses an immediate or perceived immediate risk to health, life, property, or environment. For example, the emergency 212 can include an auto accident, a fire, a heart attack, or a combination thereof. For a specific example, the emergency 212 can represent "fire at the corner of Main Street (St) and First St."

The current location 208 is defined as the current physical location of the emergency vehicle 206 with the navigation system 100. The destination 210 is defined as the physical location where the emergency 212 had occurred and where the emergency vehicle 206 will reach after traversing the emergency route 204.

A road segment 218 is defined as a candidate path that can be considered by the navigation system 100 as part of the emergency route 204. For example, Main St and State St can represent candidates of the road segment 218 that can be considered by the navigation system 100 for generating the emergency route 204.

A travel cost 220 is defined as the cost that the emergency vehicle 206 can incur for traversing the road segment 218. For example, the travel cost 220 can represent the amount of time required to traverse the road segment 218. For another example, the travel cost 200 can represent the amount fuel required to traverse the road segment 218.

An entry 214 is defined as the input made by the user, the navigation system 100, or a combination thereof into the first device 102 for reaching the destination 210. For example, the entry 214 can represent a manual typing, an oral command, or a combination thereof. For a specific example, the entry 214 can be "Main St and First St."

Traffic information 216 is defined as information related to the traffic condition between the current location 208 and the destination 210. For example, the emergency vehicle 206 can receive the traffic information 216 indicating that there is heavy traffic on Main St. For another example, the traffic information 216 can indicate the physical location of each of the vehicles that are other than the emergency vehicle 206.

In this example, the emergency vehicle 206 representing a fire truck can head towards the emergency 212 representing a fire at the destination 210 representing the corner of Main St and First St. Because the traffic information 216 indicates that there is heavy traffic on Main St and the travel cost 220 to traverse the road segment 218 representing Main St exceeds the travel cost 220 to traverse the road segment 218 representing State St, the emergency route 204 can guide the fire truck to take State St instead of Main St to reach the destination 210. The details regarding the generation of the emergency route 204 will be discussed later.

Figure 2:
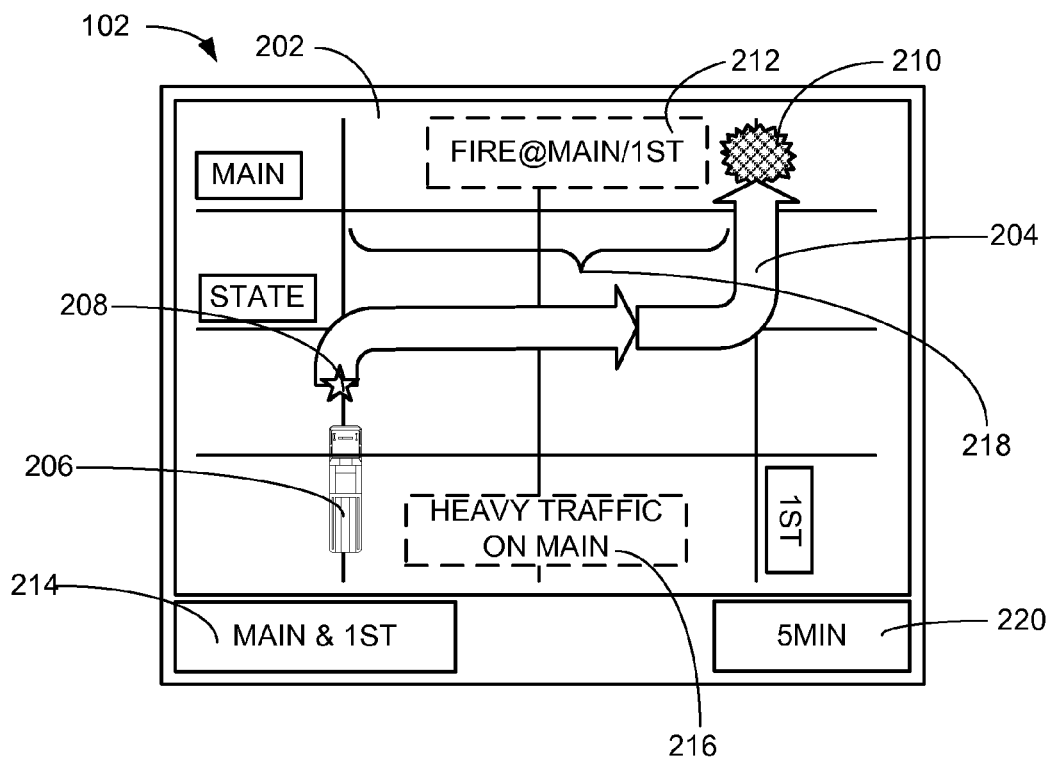
FIG. 2 is an example display of a display interface of the first device.
Figure 3:
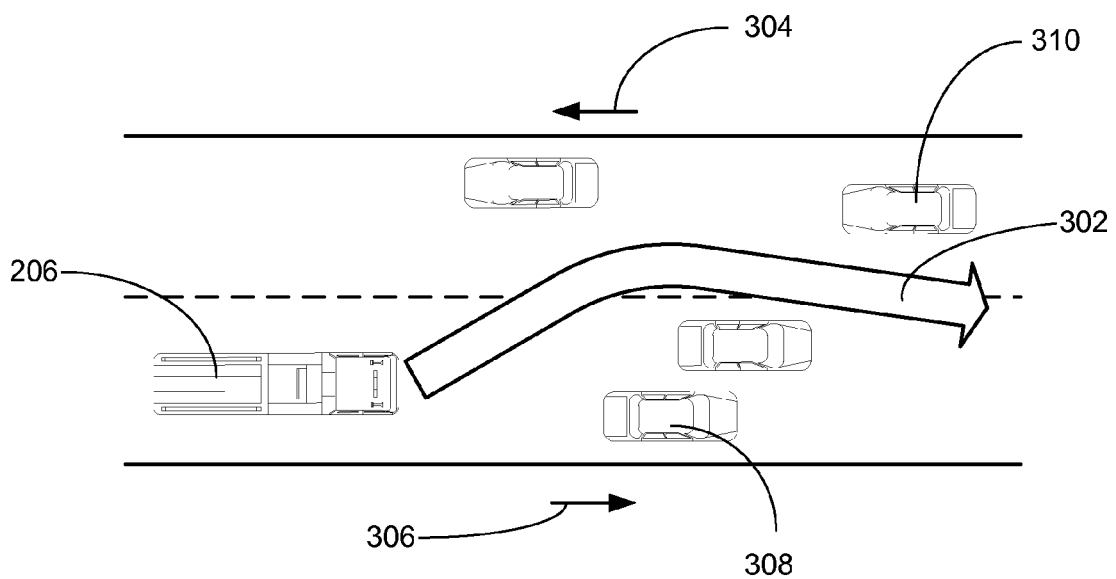
FIG. 3 is a first example of the emergency vehicle traversing the emergency route of FIG. 2.

Referring now to FIG. 3, therein is shown a first example of the emergency vehicle 206 traversing the emergency route 204 of FIG. 2. The emergency vehicle 206 can take the emergency route 204, which can include a fastest path 302 to reach the destination 210 of FIG. 2. The fastest path 302 is defined as a path that the emergency vehicle 206 can take to reach the destination 210 with the shortest amount of time including traveling against the flow of traffic. For example, the emergency vehicle 206 can traverse on the other side of the road where a traffic flow 304 is going against the emergency vehicle 206, because by crossing over a road divider to the other side of the road, the emergency vehicle 206 can reach the destination 210 much quicker.

The emergency route 204 incorporates the fastest path 302. For example, the emergency route 204 can include the fastest path 302 that guides the emergency vehicle 206 to cross over the road divider to traverse on the other side of the road where the traffic flow 304 is going against the direction where the emergency vehicle 206 is heading.

The traffic flow 304 is defined as the total number of vehicle passing a given point in a given time towards a given direction, expressed as vehicles per hour. For example, the traffic flow 304 can go against or with the direction that the emergency vehicle 206 is heading towards.

An emergency vehicle's direction 306 is defined as a direction in which the emergency vehicle 206 is heading towards while traversing the emergency route 204. For example, a non-emergency vehicle 308 can traverse against the emergency vehicle's direction 306 by heading towards the opposite direction.

The non-emergency vehicle 308 is defined as any vehicle that is not designated and not authorized to respond to the emergency 212 of FIG. 2. For example, the non-emergency vehicle 308 can include a commercial bus, a taxi, or a passenger car.

A vehicle location 310 is defined as the physical location of the non-emergency vehicle 308 along the emergency route 204. For example, the traffic information 216 of FIG. 2 can include the vehicle location 310 of the non-emergency vehicle 308.

For example, the navigation system 100 can extrapolate that the vehicle location 310 of the non-emergency vehicle 308 that is traversing with the emergency vehicle's direction 306 based on the traffic information 216. Furthermore, by extrapolating the vehicle location 310, the navigation system 100 can recognize that the vehicle location 310 of the non-emergency vehicle 308 can block the emergency vehicle 206 from proceeding forward.

The navigation system 100 can guide the emergency vehicle 206 to avoid the non-emergency vehicle 308 by generating the fastest path 302 that crosses over the road divider on to the other side of the road to continue traversing along the emergency route 204. Details regarding the navigation system 100 extrapolating the vehicle location 310 will be discussed later.

Figure 4:
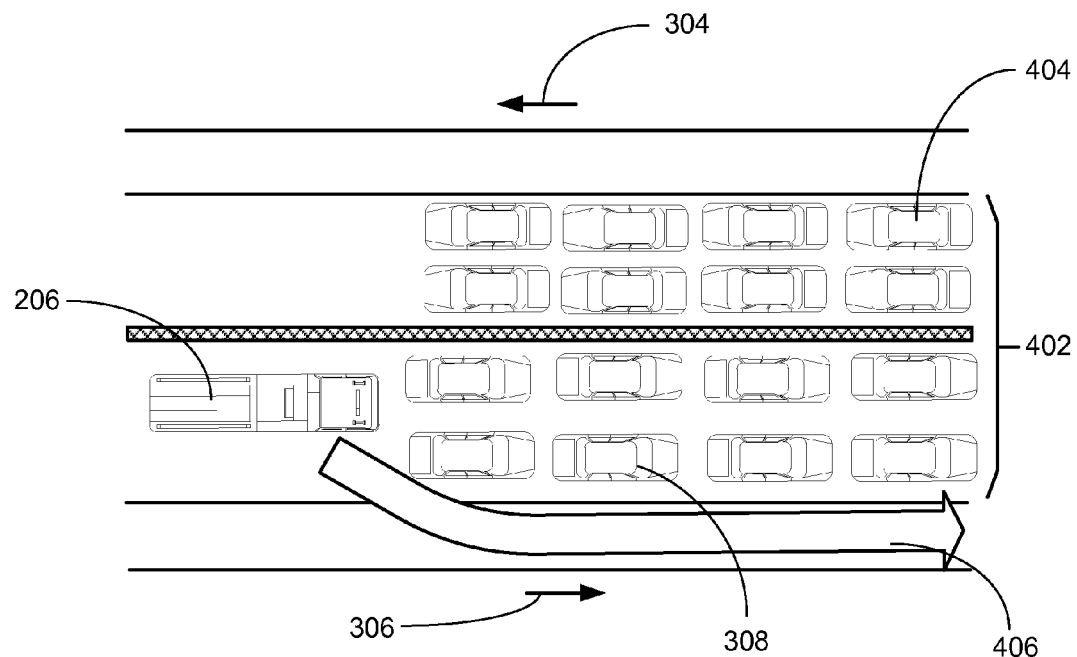
FIG. 4 is a second example of the emergency vehicle traversing the emergency route of FIG. 2.

Referring now to FIG. 4, therein is shown a second example of the emergency vehicle 206 traversing the emergency route 204 of FIG. 2. Traffic congestion 402 is defined as a traffic condition which the traffic is slowly moving or not moving at all due to the non-emergency vehicle 308 congesting the roadways or by other causes that stops or slows traffic flow. In this example, the traffic congestion 402 can deter the emergency vehicle 206 from reaching the destination 210 of FIG. 2 quickly, because the non-emergency vehicle 308 can block the roadways.

A current vehicle location 404 is defined as the current physical location of the non-emergency vehicle 308. For example, the navigation system 100 can detect that the current vehicle location 404 of the non-emergency vehicle 308 to be 100 meters in front of the emergency vehicle 206.

The emergency route 204 can include an off-road path 406. The off-road path 406 is defined as a path not permitted for the non-emergency vehicle 308 to traverse to reach its target destination. The fastest path 302 of FIG. 3 incorporates the off-road path 406 for the emergency vehicle 206 to quickly reach the destination 210.

In this example, the road divider that represents a concrete wall inhibiting the emergency vehicle 206 from crossing over to the other side of the road with the traffic flow 304 that is going against the emergency vehicle's direction 306. Additionally, the traffic congestion 402 can also inhibit the emergency vehicle 206 from crossing over to the other side of the road to reach the destination 210 quickly. The navigation system 100 can generate the fastest path 302 that incorporates the off-road path 406 that guides the emergency vehicle 206 to traverse along the shoulder of the freeway to permit the emergency vehicle 206 to continue traversing on the emergency route 204.

Figure 5:
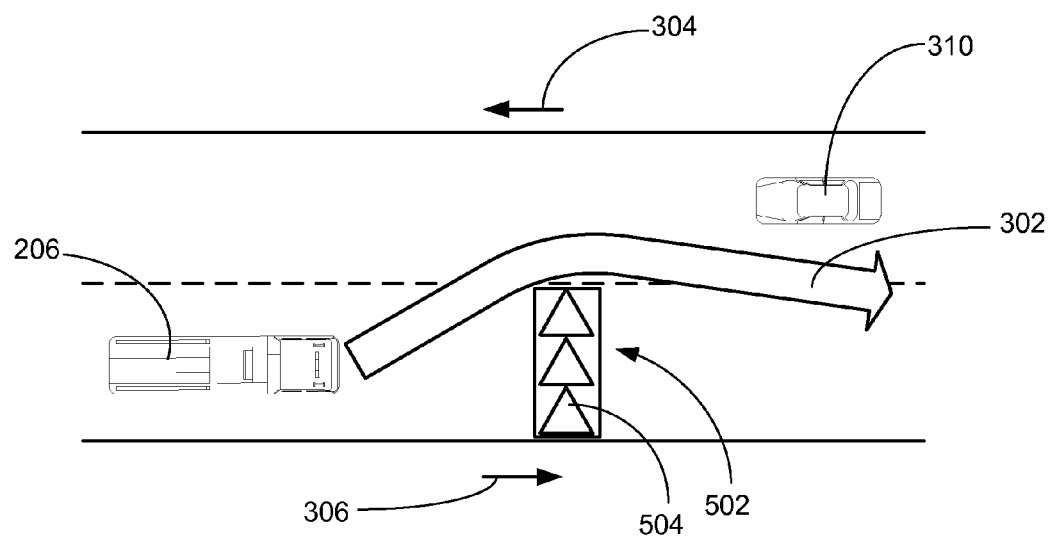
FIG. 5 is a third example of the emergency vehicle traversing the emergency route of FIG. 2.

Referring now to FIG. 5, therein is shown a third example of the emergency vehicle 206 traversing the emergency route 204 of FIG. 2. A stationary obstacle 502 is defined as an inanimate object that can block the emergency vehicle 206 from continuing to reach the destination 210 of FIG. 2. For example, the stationary obstacle 502 can represent a roadblock, a tree, or a building.

An obstacle location 504 is defined as the physical location of the stationary obstacle 502. For example, the navigation system 100 can detect that the obstacle location 504 of the stationary obstacle 502 based on the traffic information 216 of FIG. 2. Details regarding the navigation system 100 detecting the obstacle location 504 will be discussed later.

In this example, the navigation system 100 can generate the fastest path 302 that avoids the stationary obstacle 502 based on the obstacle location 504. To avoid the stationary obstacle 502, the emergency route 204 can include the fastest path 302 that crosses over to the other side of the road where the traffic flow 304 is flowing against the emergency vehicle's direction 306.

Figure 6:
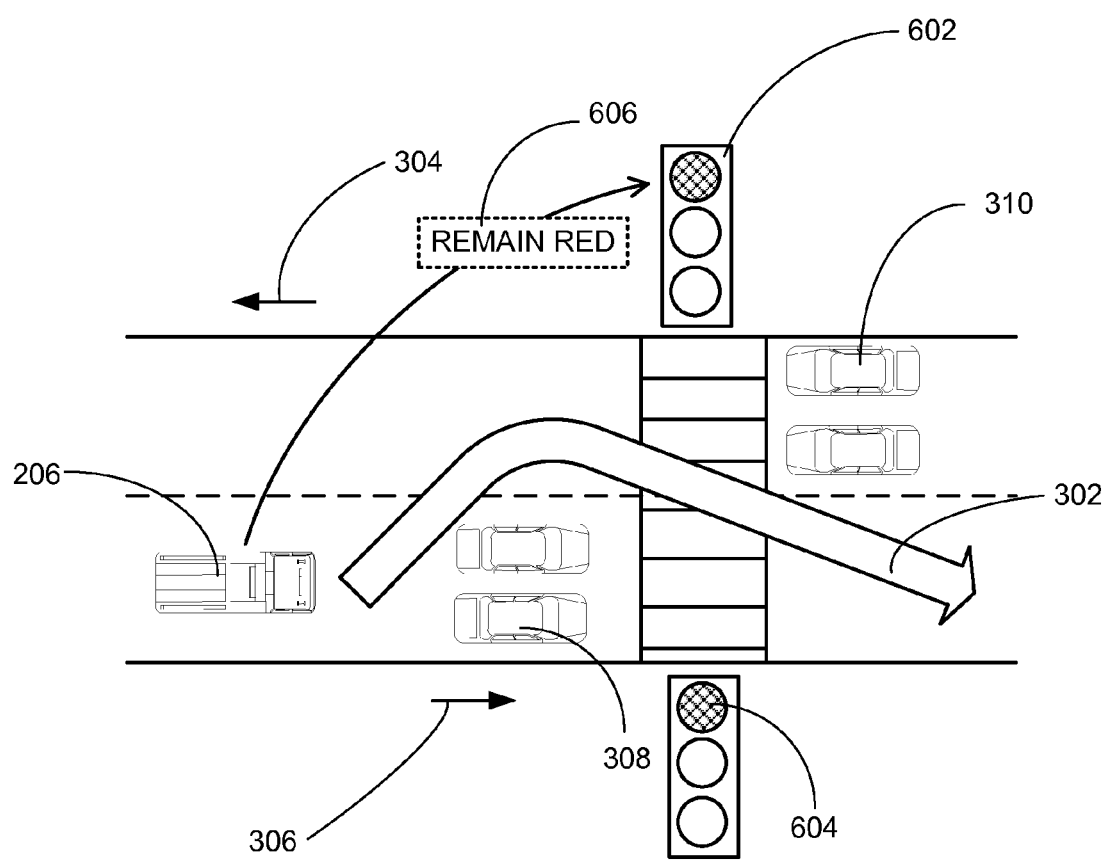
FIG. 6 is a fourth example of the emergency vehicle traversing the emergency route of FIG. 2.

Referring now to FIG. 6, therein is shown a fourth example of the emergency vehicle 206 traversing the emergency route 204 of FIG. 2. A traffic controller 602 is defined as a device that controls the flow of the traffic. For example, the traffic controller 602 can include a traffic light, a stop sign, or a detour sign.

A traffic signal condition 604 is defined as a condition signaled by the traffic controller 602 to control the flow of the traffic. For example, the traffic controller 602 can represent a traffic light. The traffic signal condition 604 can represent colors red, yellow, or green of a traffic light to signify whether a vehicle can proceed. For another example, the traffic controller 602 can represent a stop sign. The traffic signal condition 604 can represent the "stop" condition once the vehicle reaches a stop sign.

A notification 606 is defined as a message to control the traffic signal condition 604 of the traffic controller 602. For example, the traffic controller 602 can represent a traffic light. The navigation system 100 can send the notification 606 to control the traffic controller 602 to remain red.

In this example, the navigation system 100 can send the notification 606 to the traffic controller 602 to keep the traffic signal condition 604 to be red. By sending the notification 606, the navigation system 100 can generate the emergency route 204 that incorporates the fastest path 302 that crosses over to the other side of the road where the traffic flow 304 is flowing against the emergency vehicle's direction 306. The non-emergency vehicle 308 on the other side of the road will be forced to stop at the traffic controller 602 showing the traffic signal condition 604 of a red light while the emergency vehicle 206 traverses the emergency route 204 to reach the destination 210. Details regarding the navigation system 100 sending the notification 606 to the traffic controller 602 will be discussed later.

Figure 7:
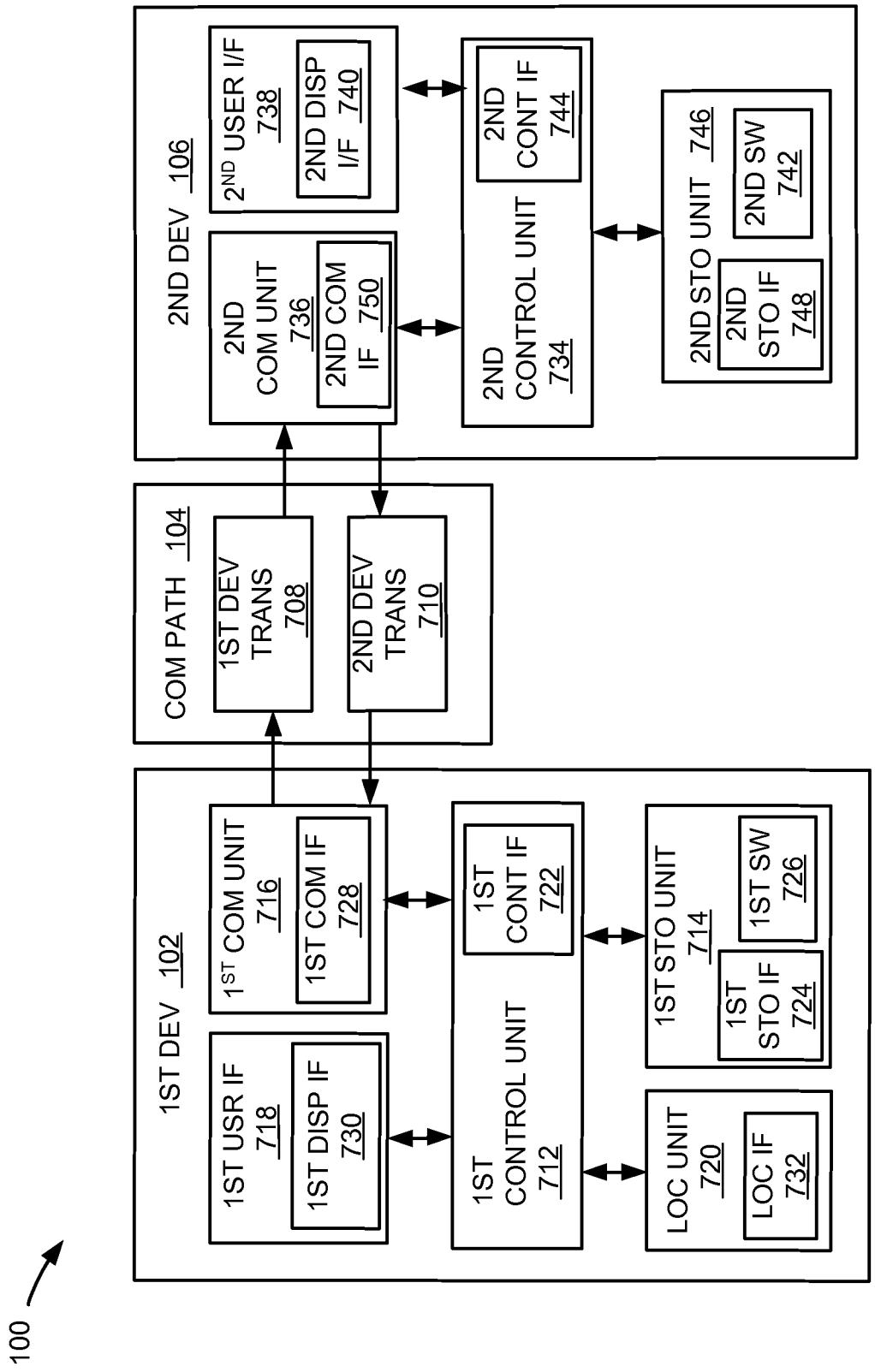
FIG. 7 is an exemplary block diagram of the navigation system.

Referring now to FIG. 7, therein is shown an exemplary block diagram of the navigation system 100. The navigation system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the navigation system 100. The first control unit 712 can be implemented in a number of different manners. For example, the first control unit 712 can be a processor, an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations external to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations external to the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof.

The first storage unit 714 can be a volatile memory, a nonvolatile memory, an internal memory, an external memory, or a combination thereof. For example, the first storage unit 714 can be a nonvolatile storage such as nonvolatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations external to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. The first display interface 730 can include a display, a projector, a video screen, a speaker, or any combination thereof The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 via the first communication unit 716.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations external to the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system (MEMS), optical circuitry, waveguides, wireless circuitry, wireline circuitry, or a combination thereof A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory (NVRAM), Flash memory, disk storage, or a volatile storage such as static random access memory (SRAM).

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations external to the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

Figure 8:
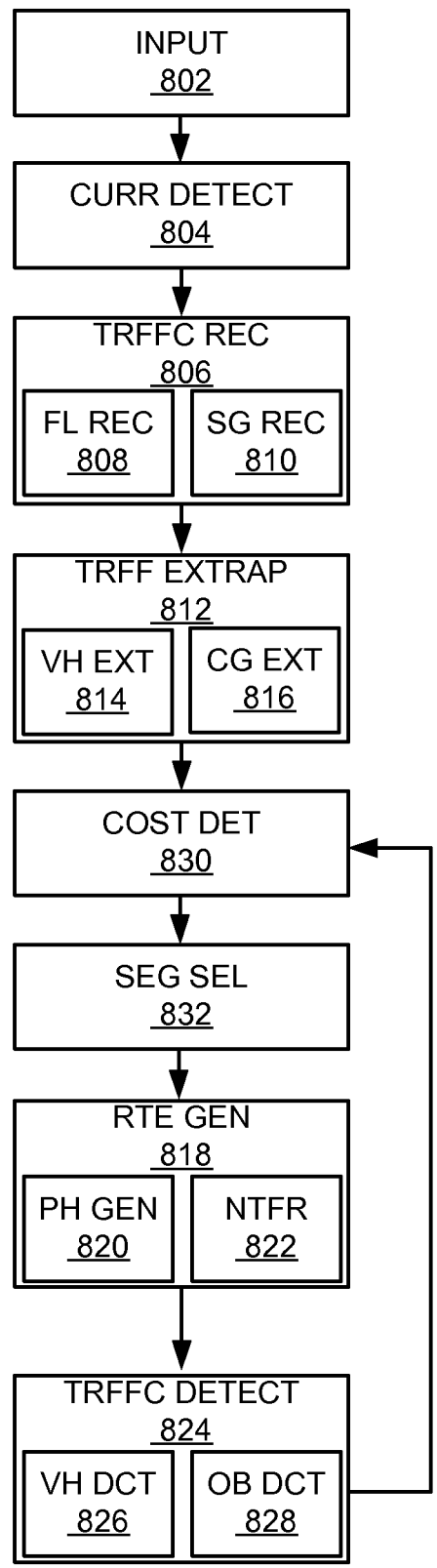
FIG. 8 is a control flow of the navigation system.

Referring now to FIG. 8, therein is shown a control flow of the navigation system 100. The navigation system 100 can include an input module 802. The input module 802 receives the entry 214 of FIG. 2 for the destination 210 of FIG. 2 from the user, the navigation system 100, or a combination thereof. For example, the input module 802 can receive the entry 214 for the destination 210 where the emergency 212 of FIG. 2 had occurred. The entry 214 can be manual typing, an oral command, or a combination thereof The navigation system 100 can include a current detector module 804. The current detector module 804 detects the physical location of the emergency vehicle 206 of FIG. 2. For example, the current detector module 804 can detect the current location 208 of FIG. 2 for locating the emergency vehicle 206. The current detector module 804 can detect the current location 208 via the location unit 720 of FIG. 7.

The navigation system 100 can include a traffic recognizer module 806. The traffic recognizer module 806 receives the information related to the traffic where the emergency vehicle 206 can travel and along the emergency route 204. For example, the traffic recognizer module 806 can receive the traffic information 216 of FIG. 2 between the current location 208 and the destination 210 for identifying the traffic flow 304 of FIG. 3.

The traffic recognizer module 806 can receive the traffic information 216 in a number of ways. The traffic recognizer module 806 includes a flow recognizer module 808. The flow recognizer module 808 receives information related to the traffic flow 304. For example, the flow recognizer module 808 can receive the traffic information 216 for the traffic flow 304 with or against the emergency vehicle's direction 306 of FIG. 3 to reach the destination 210.

For example, the flow recognizer module 808 can receive the traffic information 216 via the first control interface 722 of FIG. 7 from external sources in a number of ways. The flow recognizer module 808 can receive the traffic information 216 for the traffic flow 304 from public sources, such as 511.org (™), the Traffic Data Branch(™), or a combination thereof.

For another example, the non-emergency vehicle 308 of FIG. 3 can be equipped with a GPS navigation system, which provides position information of the non-emergency vehicle 308. Furthermore, the GPS navigation system of the non-emergency vehicle 308 can include a GPS tracking service that can transmit the vehicle location 310 of the non-emergency vehicle 308 to the navigation system 100. The flow recognizer module 808 can receive the traffic information 216 related to the vehicle location 310 in real-time to keep track of the changes of the vehicle location 310 as the non-emergency vehicle 308 changes position.

The traffic recognizer module 806 includes a signal recognizer module 810. The signal recognizer module 810 receives the traffic signal condition 604 of FIG. 6 from the traffic controller 602 of FIG. 6. For example, the signal recognizer module 810 can receive the traffic signal condition 604 in response to the notification 606 of FIG. 6. The signal recognizer module 810 can receive the traffic signal condition 604 via the first control interface 722 from external sources, such as the traffic controller system operated by the Department of Transportation or a local municipality.

The navigation system 100 can include a traffic extrapolator module 812. The traffic extrapolator module 812 extrapolates the physical location of the obstacles that can exist along the emergency route 204 of FIG. 2. For example, the traffic extrapolator module 812 can extrapolate the vehicle location 310 based on the traffic information 216 for locating the non-emergency vehicle 308 in the traffic flow 304 with or against the emergency vehicle's direction 306.

The traffic extrapolator module 812 can extrapolate in a number of ways. The traffic extrapolator module 812 includes a vehicle extrapolator module 814. The vehicle extrapolator module 814 extrapolates physical location of the non-emergency vehicle 308. For example, the vehicle extrapolator module 814 can extrapolate the vehicle location 310 in the traffic flow 304 against the emergency vehicle's direction.

For a specific example, the non-emergency vehicle 308 can transmit the traffic information 216 related to the vehicle location 310 in real-time to the navigation system 100 utilizing the GPS tracking service as discussed previously. For a different example, the non-emergency vehicle 308 can periodically, for example every five minutes, transmit the traffic information 216 related to the vehicle location 310 to the navigation system 100.

The vehicle location 310 can include the GPS coordinates of the non-emergency vehicle 308. The vehicle location 310 can change as the non-emergency vehicle 308 moves. By tracking how large the differences between the changes of the vehicle location 310 and how fast the changes occur as the non-emergency vehicle 308 progresses in the traffic flow 304, the vehicle extrapolator module 814 can extrapolate where the vehicle location 310 can be when the emergency vehicle 206 traverses the emergency route 204.

The traffic extrapolator module 812 includes a congestion extrapolator module 816. The congestion extrapolator module 816 extrapolates the traffic condition for the emergency route 204. For example, the congestion extrapolator module 816 can extrapolate the traffic congestion 402 of FIG. 4 based on the traffic information 216 for the traffic flow 304 with or against the emergency vehicle's direction 306 to reach the destination 210.

For a specific example, as discussed previously, the non-emergency vehicle 308 can periodically transmit the traffic information 216 related to the vehicle location 310 to the navigation system 100. By tracking the number of vehicle location 310 for the non-emergency vehicle 308 passing a given point at a given time, the congestion extrapolator module 816 can extrapolate the traffic congestion 402 where the emergency vehicle 206 can traverse through for the emergency route 204.

Additionally, the traffic information 216 for the traffic flow 304 received from public sources, such as 511.org (™), the Traffic Data Branch(™), or a combination thereof can be updated periodically. The congestion extrapolator module 816 can extrapolate the traffic congestion 402 based on the changes in the traffic flow 304 where the emergency vehicle 206 can traverse along the emergency route 204 based on the traffic information 216 provided by the public sources.

The navigation system 100 can include a cost determinator module 830. The cost determinator module 830 determines the cost that the emergency vehicle 206 can incur for reaching the destination 210. For example, the cost determinator module 830 can calculate the travel cost 220 of FIG. 2 for traversing the road segment 218 of FIG. 2.

The cost determinator module 830 can determine the travel cost 220 in a number of ways. For example, the travel cost 220 can represent the amount of time that the emergency vehicle 206 can required for traversing the road segment 220. The road segment 218 can represent a roadway without a road elevation differential. The cost determinator module 830 can calculate the travel cost 220 for traversing the road segment 218 by dividing the physical length of the road segment 218 that includes permitting the emergency vehicle 206 to cross over to the other side of the roadway by the travel speed that the emergency vehicle 206 can traverse on the road segment 218. The cost determinator module 830 can also calculate the travel cost 220 by tracking the speed of the non-emergency vehicle 308 changing the vehicle location 310 in the traffic flow 304 that flows with the emergency vehicle's direction 306.

For another example, the cost determinator module 830 can assign the travel cost 220 for the road segment 218. The cost determinator module 830 can include a map. The map can detail which roadway includes a shoulder, a high occupancy vehicle (HOV) lane, a dirt road, or a combination thereof.

The cost determinator module 830 can assign a lower of the travel cost 220 for the road segment 218 with a shoulder than the road segment 218 without a shoulder, because the shoulder can be incorporated as part of fastest path 302 for the emergency route 204. The cost determinator module 830 can assign a higher of the travel cost 220 for the road segment 218 representing a dirt road compared to the road segment 218 representing an asphalt road, because the emergency vehicle 206 can travel faster on the asphalt road.

The navigation system 100 can include a segment selector module 832. The segment selector module 832 chooses a path that is least costly for the emergency vehicle 206 to traverse for reaching the destination 210. For example, the segment selector module 832 can select the road segment 218 with the lowest of the travel cost 220.

The segment selector module 832 can select the road segment 218 in a number of ways. For example, one the road segment 218 can represent Main St and the other of the road segment 219 can represent State St. As illustrated in FIG. 2, since there is heavy traffic on Main St, the segment selector module 832 can select the road segment 218 representing State St, because the travel cost 220 for traversing State St can be lower than the travel cost 220 for traversing Main St.

For a different example, Main St and State St both can have heavy traffic. However, unlike Main St where the road divider can be a high concrete wall, the State St can divide the traffic only by a road divider line. Because the emergency vehicle 206 can cross over to the other side for State St to avoid the traffic congestion 402 heading towards the same direction as the emergency vehicle's direction 306, the segment selector module 218 can select State St for the lower of the travel cost 220.

For another example, the segment selector module 832 can select the road segment 218 that has been assigned by the cost determinator module 830 for the lower of the travel cost 220. For a specific example, the segment selector module 832 can select the road segment 218 with the HOV lane over the road segment 218 without the HOV lane, because the HOV lane provides more option for the emergency vehicle 206 to reach the destination 210 quickly.

The navigation system 100 can include a route generator module 818. The route generator module 818 generates a path to the destination 210 where the emergency 212 had occurred. For example, the route generator module 818 can generate the emergency route 204 from the current location 208 to the destination 210 by accommodating the vehicle location 310 for displaying on the first device 102.

The route generator module 818 can generate the emergency route 204 in a number of ways. The route generator module 818 includes a path generator module 820. The path generator module 820 generates the fastest path 302 of FIG. 3. For example, the path generator module 820 can generate the emergency route 204 against the traffic flow 304 to avoid the vehicle location 310 for avoiding the non-emergency vehicle 308.

For a more specific example, by extrapolating the vehicle location 310 in the traffic flow 304 with or against the emergency vehicle's direction 306, the path generator module 820 can generate the emergency route 204 that accommodates the vehicle location 310. To accommodate the vehicle location 310, the path generator module 820 can not only generate the emergency route 204 that traverses a particular roadway, but also can generate the fastest path 302 that avoids the vehicle location 310 for the non-emergency vehicle 308 within that particular roadway as illustrated in FIG. 3.

Furthermore, by receiving the traffic signal condition 604 of the traffic controller 602, the path generator module 820 can generate the emergency route 204 based on the traffic signal condition 604 for avoiding the non-emergency vehicle 308. Additionally, by extrapolating the traffic congestion 402, the path generator module 820 can generate the fastest path 302 based on the traffic congestion 402 for avoiding the non-emergency vehicle 308.

For another example, the path generator module 820 can ignore the traffic signal condition 604 along the emergency route 204 for reaching the destination 210. Even if the traffic signal condition 604 is a red light, the emergency vehicle 206 is permitted to ignore the traffic signal condition 604.

For a different example, the path generator module 820 can generate the emergency route 204 incorporating the off-road path 406 to reach the destination 210. The path generator module 820 can contain a map. The map can provide information regarding a particular roadway. More specifically, the map can provide which roadway provides a road divider that permits the emergency vehicle 206 to cross over to the other side of the road. The map can also include which road contains a sidewalk or shoulder for the path generator module 820 to generate the fastest path 302 to avoid the traffic congestion 402.

As illustrated in FIG. 4, the traffic congestion 402 and the road divider can block the emergency vehicle 206 from crossing over to the other side of the road. In this example, the path generator module 820 can generate the fastest path 302 based on the map that incorporates the off-road path 406 that traverses on the shoulder of the road or the sidewalk of the road to permit the emergency vehicle 206 to reach the destination 210 quickly.

For another example, the path generator module 820 can generate the emergency route 204 based on incorporating the road segment 218 with the lowest of the travel cost 220 for reaching the destination 210. As illustrated in FIG. 2, the emergency vehicle 206 can incur higher of the travel cost 220 for traveling Main St instead of State St due to heavy traffic on Main St. The path generator module 820 can incorporate the road segment 218 representing State St as part of the emergency route 204 for reaching the destination 210.

The route generator module 818 includes a notifier module 822. The notifier module 822 sends messages to the traffic controller 602 or alerts the non-emergency vehicle 308 to reduce the traffic congestion 402. For example, the notifier module 822 can send the notification 606 for reducing the traffic congestion 402 by controlling the traffic controller 602 with the notification 606.

For a specific example, the notifier module 822 can send the notification 606 via the first control interface 722 to the traffic controller system operated by the Department of Transportation or a local municipality. As illustrated in FIG. 6, the notification 606 can signal the traffic controller 602 representing a traffic light to remain red. After receiving the traffic signal condition 604 in response to the notification 606, the path generator module 820 can generate the emergency route 204 that can safely avoid the non-emergency vehicle 308 even if the fastest path 302 crosses over to the other side of the road that flows against the emergency vehicle's direction 306.

As a further example, the notifier module 822 can send the notification 606 to the non-emergency vehicles 308 that the emergency vehicle 206 is approaching them. The notification 606 to the non-emergency vehicles 308 is in advance of what sirens from the emergency vehicles 206 that can be heard by the occupants in the non-emergency vehicle 308.

Depending on the traffic congestion 402, the notification 606 can be sent a predetermined distance from the traffic congestion 402 to allow time for the non-emergency vehicle 308 to reduce the traffic congestion 402. The predetermined distance for the notification 606 is defined as a distance permitting the time for the non-emergency vehicle 308 to maneuver to reduce the traffic congestion 402.

The predetermined distance can be calculated by the speed of the emergency vehicle 206 and the time required for the non-emergency vehicle 308 to maneuver. This time for the non-emergency vehicle 308 to maneuver depends on the type of the traffic congestion 402 and the surrounding conditions that may permit or restrict the movement of the non-emergency vehicle 308. For example, as in the example described in FIG. 4, the non-emergency vehicle 308 to maneuver can move off the freeway to permit the emergency vehicle 206 to pass the traffic congestion 402.

The navigation system 100 can include a traffic detector module 824. The traffic detector module 824 detects the current physical location of the obstacles located along the emergency route 204. For example, the traffic detector module 824 can detect the current vehicle location 404 of FIG. 4 for locating the non-emergency vehicle 308.

The traffic detector module 824 can detect in a number of ways. The traffic detector module 824 includes a vehicle detector module 826. The vehicle detector module 826 detects the current physical location of an obstacle or vehicle that is mobile. For example, the vehicle detector module 826 can detect the current vehicle location 404 for locating the non-emergency vehicle 308.

The vehicle detector module 826 can detect the current vehicle location 404 by the strength of the signal transmitted by the non-emergency vehicle 308 to the navigation system 100 or to the emergency vehicle 206. As the emergency vehicle 206 nears the non-emergency vehicle 308, the strength of the signal can be stronger.

Additionally, if the non-emergency vehicle 308 is to the right of the emergency vehicle 206, the signal coming from the non-emergency vehicle 308 can be stronger from the right hand side than from the left hand side of the emergency vehicle 206. By detecting the GPS coordinate of the non-emergency vehicle 308 and the strength of the signal transmitted by the non-emergency vehicle 308, the vehicle detector module 826 can detect the current vehicle location 404.

The traffic detector module 824 includes an obstacle detector module 828. The obstacle detector module 828 detects the physical location of an obstacle that is stationary. For example, the obstacle detector module 828 can detect the obstacle location 504 of FIG. 5 of the stationary obstacle 502 of FIG. 5.

The obstacle detector module 828 can detect the obstacle location 504 in a number of ways. For example, the obstacle detector module 828 can include a map of the geographic area. The map can indicate the obstacle location 504 of a high wall road divider, building, or a combination thereof The obstacle detector module 828 can detect the obstacle location 504 of the high wall road divider, building, or a combination thereof based on the map.

The obstacle detector module 828 can detect or determine the obstacle location 504 based on the traffic information 216. For example, the traffic information 216 can include when the drawbridge pulls up. When the bridge is up to permit the boats to pass, the route generator module 818 can avoid generating the emergency route 204 that traverses through the road segment 218 having the drawbridge. The traffic detector module 824 can send information for the current vehicle location 404 and the obstacle location 504 to the cost determinator module 504 for updating the calculation of the travel cost 220.

For illustrative purposes, the navigation system 100 can include the notifier module 822 sending the notification 606, although it is understood that the navigation system 100 can operate the notifier module 822 differently. For example, the notifier module 822 can alert the non-emergency vehicle 308 for clearing the non-emergency vehicle 308 to reduce the traffic congestion 402 along the emergency route 204. The notifier module 822 can alert the non-emergency vehicle 308 by playing the siren to notify the non-emergency vehicle 308 that the emergency vehicle 206 is approaching.

For illustrative purposes, the navigation system 100 can include the path generator module 820 generating the fastest path 302, although it is understood that the navigation system 100 can operate the path generator module 820 differently. For example, the path generator module 820 can update the emergency route 204 based on the current vehicle location 404 relative to the current location 208 of the emergency vehicle 206.

As discussed previously, the path generator module 820 can generate the fastest path 302 based on the vehicle location 310 that has been extrapolated. As the emergency vehicle 206 approaches the non-emergency vehicle 308, the vehicle location 310 and the current vehicle location 404 can be different. Specifically, the non-emergency vehicle 308 coming from the traffic flow 304 against the emergency vehicle's direction 306 can make a left turn. The path generator module 820 can update the emergency route 204 in real-time by accommodating the current vehicle location 404 to avoid the non-emergency vehicle 308 making a left turn and reach the destination 210 safely.

Additionally, the path generator module 820 can generate the fastest path 302 based on the obstacle location 504. As discussed previously, the fastest path 302 to the destination 210 can include the emergency route 204 that traverses through a drawbridge. If the updated version of the traffic information 216 indicates that the drawbridge is rising, the path generator module 820 can update the emergency route 204 based on the obstacle location 504 relative to the current location 208 of the emergency vehicle 206 to avoid traversing on the road segment 218 having the drawbridge as part of the emergency route 204.

For a different example, the path generator module 820 can update the emergency route 204 based on the non-emergency vehicle 308 removed from the traffic flow 304. As discussed previously, the notifier module 822 can alert the non-emergency vehicle 308 using a siren to clear the path. As a result, the signal from the non-emergency vehicle 308 that indicates the current vehicle location 404 can change.

For example, if the non-emergency vehicle 308 pulls over to the right side of the road, the signal from the non-emergency vehicle 308 can come from the right. Based on the changes of the current vehicle location 404, the path generator module 820 can update the emergency route 204 that allows the emergency vehicle 206 to reach the destination 210 quickly.

The physical transformation from displaying the emergency route 204 result in movement in the physical world, such as people using the first device 102, the vehicle, or a combination thereof, based on the operation of the navigation system 100. As the movement in the physical world occurs, the movement itself creates additional information that is converted back to the current location 208, the current vehicle location 404, and the fastest path 302 for the continued operation of the navigation system 100 and to continue the movement in the physical world.

The first software 726 of FIG. 7 of the first device 102 of FIG. 7 can include the navigation system 100. For example, the first software 726 can include the input module 802, the current detector module 804, the traffic recognizer module 806, the traffic extrapolator module 812, the cost determinator module 830, the segment selector module 832, the route generator module 818, and the traffic detector module 824.

The first control unit 712 of FIG. 7 can execute the first software 726 for the input module 802 to receive the entry 214. The first control unit 712 of can execute the first software 726 for the current detector module 804 to detect the current location 208. The first control unit 712 of can execute the first software 726 for the traffic recognizer module 806 to receive the traffic information 216.

The first control unit 712 of can execute the first software 726 for the traffic extrapolator module 812 to extrapolate the vehicle location 310. The first control unit 712 of can execute the first software 726 for the cost determinator module 830 to calculate the travel cost 220. The first control unit 712 of can execute the first software 726 for the segment selector module 832 to select the road segment 218.

The first control unit 712 of can execute the first software 726 for the route generator module 818 to generate the emergency route 204. The first control unit 712 of can execute the first software 726 for the traffic detector module 824 to detect the current vehicle location 404. The first control unit 712 of can execute the first display interface 730 of FIG. 7 to display the emergency route 204.

The second software 742 of FIG. 7 of the second device 106 of FIG. 7 can include the navigation system 100. For example, the second software 742 can the input module 802, the current detector module 804, the traffic recognizer module 806, the traffic extrapolator module 812, the cost determinator module 830, the segment selector module 832, the route generator module 818, and the traffic detector module 824.

The second control unit 734 of FIG. 7 can execute the second software 742 for the input module 802 to receive the entry 214. The second control unit 734 can execute the second software 742 for the current detector module 804 to detect the current location 208.

The second control unit 734 can execute the second software 742 for the traffic recognizer module 806 to receive the traffic information 216.

The second control unit 734 can execute the second software 742 for the traffic extrapolator module 812 to extrapolate the vehicle location 310. The second control unit 734 can execute the second software 742 for the cost determinator module 830 to calculate the travel cost 220. The second control unit 734 can execute the second software 742 for the segment selector module 832 to select the road segment 218.

The second control unit 734 can execute the second software 742 for the route generator module 818 to generate the emergency route 204. The second control unit 734 can execute the second software 742 for the traffic detector module 824 to detect the current vehicle location 404. The second control unit 734 can execute the second display interface 740 of FIG. 7 for displaying the emergency route 204.

The navigation system 100 can be partitioned between the first software 726 and the second software 742. For example, the second software 742 can include the current detector module 804, the traffic recognizer module 806, the traffic extrapolator module 812, the cost determinator module 830, the segment selector module 832, the route generator module 818, and the traffic detector module 824. The second control unit 734 can execute modules partitioned on the second software 742 as previously described.

The first software 726 can include the input module 802. Based on the size of the first storage unit 714, the first software 726 can include additional modules of the navigation system 100. The first control unit 712 can execute the modules partitioned on the first software 726 as previously described.

The first user interface 718 of FIG. 7 can receive the entry 214 by the user, the navigation system 100, or a combination thereof for the input module 802. The first control unit 712 can operate the first communication unit 716 to send the entry 214 to the second device 106. The first control unit 712 can operate the first software 726 to operate the location unit 720.

The second communication unit 736 of FIG. 7 can send the emergency route 204 to the first device 102 through the communication path 104 of FIG. 7. The emergency route 204 can be displayed on the first display interface 730 and the second device 106.

It has been discovered that the present invention provides the navigation system 100 for providing a safer operation of the emergency vehicle 206. By generating the emergency route 204 to where the emergency 212 had occurred, the navigation system 100 can decrease the exposure of harm for operating the emergency vehicle 206 and permit the emergency vehicle 206 to reach the destination 210 more quickly to manage the emergency 212. By continuously updating the emergency route 204 by generating the fastest path 302 that accommodates for the vehicle location 310 of the non-emergency vehicle 308, the navigation system 100 can aid the user of safer operation of the emergency vehicle 206.

The navigation system 100 describes the module functions or order as an example. The modules can be partitioned differently. For example, the vehicle extrapolator module 814 and the congestion extrapolator module 816 can be combined. Each of the modules can operate individually and independently of the other modules.

Furthermore, data generated in one module can be used by another module without being directly coupled to each other. For example, the traffic recognizer module 806 can receive the entry 214 for the destination 210 from the input module 802.

Figure 9:
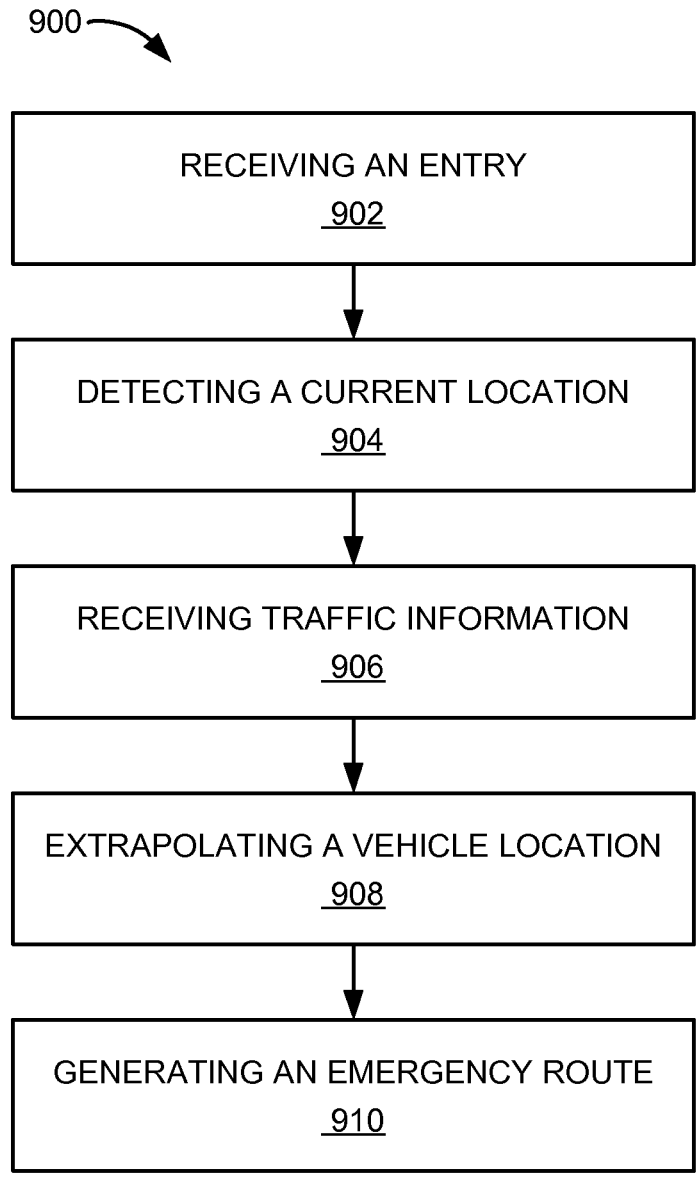
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: receiving an entry for a destination where an emergency had occurred in a block 902; detecting a current location for locating an emergency vehicle in a block 904; receiving traffic information between the current location and the destination for identifying a traffic flow in a block 906; extrapolating a vehicle location based on the traffic information for locating a non-emergency vehicle in the traffic flow in a block 908; and generating an emergency route from the current location to the destination by accommodating the vehicle location for displaying on a device in a block 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving an entry for a destination where an emergency had occurred;
   detecting a current location for locating an emergency vehicle;
   receiving traffic information between the current location and the destination for identifying a traffic flow against an emergency vehicle's direction;
   extrapolating a vehicle location based on the traffic information for locating a non-emergency vehicle in the traffic flow;
   generating an emergency route with a control unit from the current location to the destination by accommodating the vehicle location for displaying on a device, the emergency route including an off-road path representing a path unpermitted for the non-emergency vehicle to traverse to reach the destination; and sending a notification, having the current location on the emergency route, at a predetermined distance from a traffic congestion for notifying the non-emergency vehicle.

2. The method as claimed in claim 1 wherein:
receiving the traffic information includes receiving the traffic information for the traffic flow against the emergency vehicle's direction to reach the destination;
extrapolating the vehicle location includes extrapolating the vehicle location in the traffic flow against the emergency vehicle's direction; and
generating the emergency route includes generating the emergency route against the traffic flow to avoid the vehicle location for avoiding the non-emergency vehicle.

3. The method as claimed in claim 1 further comprising:
detecting a current vehicle location for locating the non-emergency vehicle; and
wherein:
generating the emergency route includes updating the emergency route based on the current vehicle location relative to the current location of the emergency vehicle.

4. The method as claimed in claim 1 further comprising:
detecting an obstacle location for locating a stationary obstacle; and
wherein:
generating the emergency route includes updating the emergency route based on the obstacle location relative to the current location of the emergency vehicle.

5. The method as claimed in claim 1 wherein:
receiving the traffic information includes receiving a traffic signal condition; and
generating the emergency route includes generating the emergency route based on the traffic signal condition for avoiding the traffic congestion.

6. The method as claimed in claim 1 further comprising:
calculating a travel cost for traversing a road segment; and
wherein generating the emergency route includes:
selecting the road segment with the lowest of the travel cost; and
generating the emergency route based on incorporating the road segment with the lowest of the travel cost for reaching the destination.

7. A method of operation of a navigation system comprising:
receiving an entry for a destination where an emergency had occurred;
detecting a current location for locating an emergency vehicle;
receiving traffic information for a traffic flow with and against an emergency vehicle's direction to reach the destination;
extrapolating a vehicle location based on each of the traffic information for locating a non-emergency vehicle in the traffic flow with or against the emergency vehicle's direction;
generating an emergency route with a control unit from the current location to the destination based on accommodating the vehicle location for displaying on a device, the emergency route including an off-road path representing a path unpermitted for the non-emergency vehicle to traverse to reach the destination; and
sending a notification, having the current location on the emergency route, at a predetermined distance from a traffic congestion for notifying the non-emergency vehicle.

8. The method as claimed in claim 7 wherein generating the emergency route includes ignoring a traffic signal condition along the emergency route for reaching the destination.

9. The method as claimed in claim 7 further comprising:
alerting the non-emergency vehicle for clearing the non-emergency vehicle to reduce the traffic congestion along the emergency route; and
wherein:
generating the emergency route includes updating the emergency route based on the non-emergency vehicle removed from the traffic flow.

10. The method as claimed in claim 7 further comprising:
sending the notification for reducing the traffic congestion by controlling a traffic controller with the notification; and
wherein:
receiving the traffic information includes receiving a traffic signal condition in response to the notification; and
generating the emergency route includes generating the emergency route based on the traffic signal condition for avoiding the non-emergency vehicle.

11. The method as claimed in claim 7 further comprising:
extrapolating the traffic congestion based on the traffic information for the traffic flow with or against the emergency vehicle's direction to reach the destination; and
wherein:
generating the emergency route includes generating the emergency route based on the traffic congestion for avoiding the non-emergency vehicle.

12. The method as claimed in claim 7 wherein generating the emergency route includes generating the emergency route incorporating the off-road path to reach the destination.

13. A navigation system comprising:
a control unit for:
receiving an entry for a destination where an emergency had occurred,
detecting a current location for locating an emergency vehicle,
receiving traffic information between the current location and the destination for identifying a traffic flow against the emergency vehicle's direction,
extrapolating a vehicle location based on the traffic information for locating a non-emergency vehicle in the traffic flow,
generating an emergency route from the current location to the destination by accommodating the vehicle location, the emergency route including an off-road path representing a path unpermitted for the non-emergency vehicle to traverse to reach the destination, and
a communication unit, coupled to the control unit, for:
sending the emergency route for displaying on a device, and
sending a notification, having the current location on the emergency route, at a predetermined distance from a traffic congestion for notifying the non-emergency vehicle.

14. The system as claimed in claim 13 wherein the control unit is for:
receiving the traffic information for the traffic flow against the emergency vehicle's direction to reach the destination;
extrapolating the vehicle location in the traffic flow against the emergency vehicle's direction; and generating the emergency route against the traffic flow to avoid the vehicle location for avoiding the non-emergency vehicle.

15. The system as claimed in claim 13 wherein the control unit is for:
   detecting a current vehicle location for locating the non-emergency vehicle; and
   updating the emergency route based on the current vehicle location relative to the current location of the emergency vehicle.

16. The system as claimed in claim 13 wherein the control unit is for:
   detecting an obstacle location for locating a stationary obstacle; and
   updating the emergency route based on the obstacle location relative to the current location of the emergency vehicle.

17. The system as claimed in claim 13 wherein the control unit is for:
   receiving the traffic information includes receiving a traffic signal condition; and
   generating the emergency route based on the traffic signal condition for avoiding the traffic congestion.

18. The system as claimed in claim 13 wherein the control unit is for:
   calculating a travel cost for traversing a road segment;
   selecting the road segment with the lowest of the travel cost; and
   generating the emergency route based on incorporating the road segment with the lowest of the travel cost for reaching the destination.

19. The system as claimed in claim 13 wherein the control unit is for:
   receiving traffic information for a traffic flow with or against the emergency vehicle's direction to reach the destination; and
   extrapolating a vehicle location based on each of the traffic information for locating a non-emergency vehicle in the traffic flow with or against the emergency vehicle's direction.

20. The system as claimed in claim 19 wherein the control unit is for ignoring a traffic signal condition along the emergency route for reaching the destination.

21. The system as claimed in claim 19 wherein the control unit is for:
   alerting the non-emergency vehicle for clearing the non-emergency vehicle to reduce the traffic congestion along the emergency route; and
   updating the emergency route based on the non-emergency vehicle removed from the traffic flow.

22. The system as claimed in claim 19 wherein the control unit is for:
   sending the notification for reducing the traffic congestion by controlling a traffic controller with the notification; and
   receiving a traffic signal condition in response to the notification; and
   the route generator module is for generating the emergency route based on the traffic signal condition for avoiding the non-emergency vehicle.

23. The system as claimed in claim 19 wherein the control unit is for:
   extrapolating the traffic congestion based on the traffic information for the traffic flow with or against the emergency vehicle's direction to reach the destination; and
   generating the emergency route based on the traffic congestion for avoiding the non-emergency vehicle.

24. The system as claimed in claim 19 wherein the control unit is for generating the emergency route incorporating the off-road path to reach the destination.

* * * * *